United States Patent [19]

Kamimura et al.

[11] Patent Number: 5,141,245
[45] Date of Patent: Aug. 25, 1992

[54] APPARATUS FOR ADJUSTING VEHICLE BODY HEIGHT

[75] Inventors: Katsuyoshi Kamimura; Atsushi Mine; Yutaka Hiwatashi, all of Tokyo, Japan

[73] Assignee: Fuji Jukogyo Kabushiki Kaisha, Tokyo, Japan

[21] Appl. No.: 713,593

[22] Filed: Jun. 11, 1991

Related U.S. Application Data

[63] Continuation of Ser. No. 415,978, Oct. 3, 1989, abandoned.

[30] Foreign Application Priority Data

Oct. 14, 1988 [JP] Japan .................. 63-259104

[51] Int. Cl.⁵ .......................................... B60G 17/015
[52] U.S. Cl. ................... 280/707; 364/424.05
[58] Field of Search ............... 280/707, DIG. 1, 840, 280/6.12, 703; 364/424.05

[56] References Cited

U.S. PATENT DOCUMENTS

| | | | |
|---|---|---|---|
| 2,882,068 | 4/1959 | Faiver | 280/DIG. 1 |
| 4,364,574 | 12/1982 | Saito | 280/707 |
| 4,611,815 | 9/1986 | Sasage et al. | 280/6.12 |
| 4,625,994 | 12/1986 | Tanaka et al. | 280/711 |
| 4,848,790 | 7/1989 | Fukunaga et al. | 280/707 |
| 4,887,840 | 12/1989 | Harara et al. | 280/707 |

FOREIGN PATENT DOCUMENTS 95921  4/1989  Japan .................. 280/6.12

Primary Examiner—Charles A. Marmor
Assistant Examiner—Karin Tyson
Attorney, Agent, or Firm—Beveridge, DeGrandi & Weilacher

[57] ABSTRACT

An apparatus for adjusting a body height of a vehicle by supplying or discharging air into or from an air suspension system includes a controller for controlling a vertical vehicle body height to a predetermined set value responsive to a signal according to an adjustment amount of the vehicle body height obtained by subtracting an objective reference vehicle body height signal from a relative displacement signal. The apparatus further includes vehicle body height change control means connected to the controller for variably controlling a vehicle body height adjustment completion time and a vehicle body height adjusting speed responsive to the vehicle speed. The vehicle body height change control means comprises a sensor for detecting the vehicle speed and generating a signal according to the vehicle speed and a logic circuit for variably controlling the vehicle body height adjusting time and the vehicle body height adjusting speed such that when the vehicle speed signal indicates a high value, the vehicle body height adjusting time is lengthened or the vehicle body height adjusting speed is lowered and when the vehicle speed signal indicates a low value, the vehicle body height adjusting time is shortened or the vehicle body height adjusting speed is increased.

20 Claims, 4 Drawing Sheets

APPARATUS FOR ADJUSTING VEHICLE BODY HEIGHT

This application is a continuation of application Ser. No. 415,978, filed Oct. 3, 1989, now abandoned.

BACKGROUND OF THE INVENTION

The present invention relates to an apparatus for adjusting a vehicle body height.

A motor vehicle is generally equipped with a wheel suspension device including an air suspension utilizing the volumetric elasticity of air. Air suspensions are disposed for the front and rear wheels on both sides. A sensor for detecting a vehicle body height is mounted to each of the air suspensions. Each of the vehicle body height sensor transmits signal for adjusting the vehicle body height so as to displace the vehicle body upwardly or downwardly by supplying air into or letting the air out of the air suspension.

An apparatus adjusting for is provided with a switching means for changing the vehicle body height from a normal height to a high height or to a low height. By switching means, when the vehicle is running on a rough road, the vehicle body is raised higher than a normal to prevent the vehicle body from touching the road. On the other hand, when the vehicle is running on a paved even road such as a highway, the vehicle body is lowered to attain running stability at high speeds. Such an apparatus for adjusting the body height described is disclosed in the Japanese Patent Laid-open Publication (KOKAI) No. 60-191810.

The height adjusting of the vehicle body is usually carried out for about 20 to 30 sec. regardless of the vehicle speed. But this may depend on the air supplying or removing capacity of the air suspension. The vehicle body height adjusting action cannot be generally felt by a driver or others. And there remains uncertainty as to whether or not the vehicle body height adjustment has been surely made. In order to overcome this problem, it may be considered to shorten the vehicle body height changing action. However, in case where such vehicle body height changing action is made rapidly regardless of the vehicle speed, the rapid change of the vehicle body height will give a sense of uneasiness to the driver.

SUMMARY OF THE INVENTION

An object of the present invention is to substantially eliminate the defects or drawbacks encountered in the prior art described above and to provide an apparatus for smoothly adjusting a vehicle body height of a motor vehicle in response to the speed of a motor vehicle, and without imparting any uneasiness or discomfort to passengers.

This and other objects can be achieved according to the present invention by providing an apparatus for adjusting a body height of a motor vehicle by supplying or discharging air into or from an air suspension system. The apparatus is provided with a controller responsive to a signal for a vehicle body height adjustment amount for controlling a vertical vehicle body height to a predetermined set value. The amount is obtained by subtracting an objective reference signal of the vehicle body height signal generated by a vehicle body height changing means from a relative displacement signal generated from a sensor for detecting a relative vertical displacement of the vehicle body. The apparatus is further characterized by that a vehicle body height change control means is operatively connected to the controller for variably controlling a vehicle body height adjustment completion time and a vehicle body height adjusting speed in response to a speed of the motor vehicle.

In a preferred embodiment, the vehicle body height change control means comprises a sensor for detecting a vehicle speed and for generating the vehicle speed signal and a logic circuit for variably controlling a vehicle body height adjusting time and a vehicle body height adjusting speed. When the vehicle speed signal indicates is high, the vehicle body height adjusting time is lengthened or the vehicle body height adjusting speed is lowered. When the vehicle speed signal is low such as at gradual deceleration of the vehicle speed adjusting speed is also lowered. Thus the vehicle body height adjusting time is shortened or the vehicle body height adjusting speed is raised.

According to the apparatus for adjusting the vehicle body height described above, the apparatus is specifically provided with a vehicle body height change control means connected to the vehicle body height controller for variably controlling a vehicle body height adjustment completion time and a vehicle body height adjusting speed responsive to a vehicle speed. Accordingly, in order to maintain stable driving conditions, the vehicle body height adjustment can be performed over a relatively long time period during high vehicle speed. On the other hand, such adjustment can be performed quickly during low vehicle speed or when parked, so that the vehicle body height adjustment can be observed.

DESCRIPTION OF THE PREFERRED EMBODIMENTS

Figure 1:
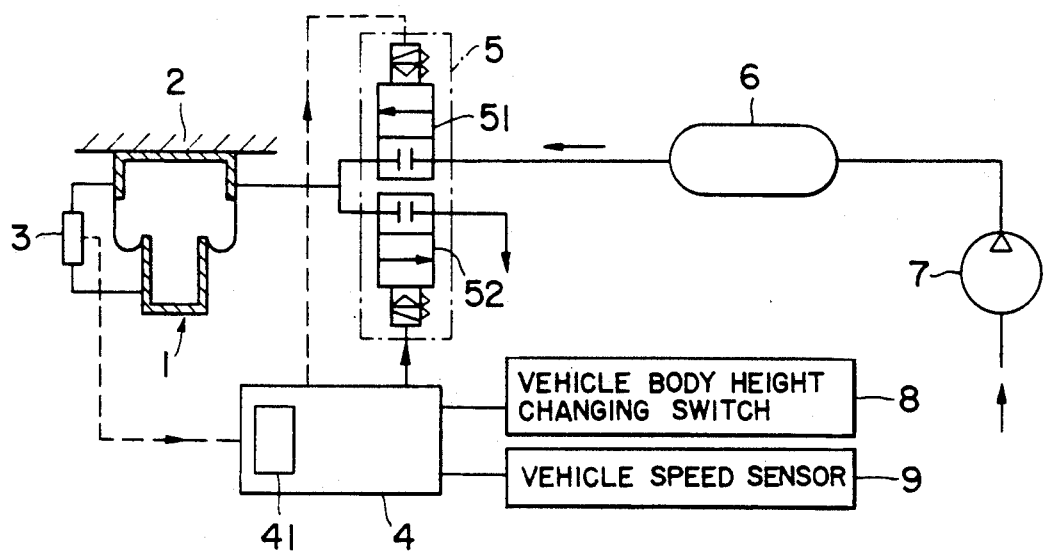
FIG. 1 is a block diagram representing an air supply and air discharge control system for an air suspension.

Referring to FIG. 1, an air suspension 1 is disposed between an upper spring member, i.e. a side member 2 of a vehicle body, and a lower spring member, i.e. a wheel axle supporting member (not shown). Thus a spring mass is supported by the volumetric elasticity of the air sealed in the air suspension 1. Namely, the height of the vehicle body is changed by charging or discharging the air to or from the air suspension 1. A suspension characteristic can also be changed by this air charging or discharging operation.

Four air suspensions 1 are connected to respective four wheels of the motor vehicle, i.e. front and rear and right and left wheels with respect to the vehicle body side members 2. Each of the air suspensions 1 is provided with a relative displacement sensor 3. The relative displacement sensor 3 detects the vertical relative displacement between the upper spring member and the lower spring member and generates a signal representing the relative displacement. The relative displacement signal from the sensor 3 is fed into a controller 4 described hereinafter. For easy understanding, only one air suspension 1 is shown in FIG. 1.

Referring to FIG. 1, an air flow regulator 5 includes an air supply valve 51 for introducing air into the air suspension 1 and an air discharge valve 52 for discharging the air from the air suspension 1. Actually, the air flow regulator 5 comprises four pair of air supply valves 51 and the air discharge valves 52 for independently controlling the air supply and air discharge of the air suspension 1 for each of the four wheels of the motor vehicle.

A reserve tank 6 is operatively connected to the air supply valve 51. The inner air pressure in the reserve tank 6 is set to a value sufficiently higher than that in the air suspension, so that the air is smoothly and rapidly supplied into the air suspension 1 from the reserve tank 6 when the air supply valve 51 is opened. In a case where the inner air pressure in the reserve tank 6 becomes below a set value thereof, an air compressor 7 connected to the reserve tank 6 is actuated to supply the air therein so as to maintain the air pressure at the set value.

The controller 4 is also connected to the air flow regulator 5. The controller 4 operates to obtain an electric signal representing an amount of the vehicle body height. By subtracting a signal representing the objective reference vehicle body height from the relative displacement signal generated from the relative displacement sensor 3 described hereinbefore, an adjustment to an objective height by a vehicle body height changing switch 8 is attained. If an amount of the adjustment is negative, a signal from the controller 4 is transmitted to the air supply valve 51 of the air flow regulator 5 to supply air into the air suspension 1 thereby displacing the vehicle body upwardly. On the other hand, if the amount of the adjustment is positive, the signal from the controller 4 is transmitted to the air discharge valve 52 of the air flow regulator 5 to let the air out of the air suspension 1 and thereby lowering the vehicle body downwardly. This vehicle body height controlling operation is continuously carried out until the signal no longer exists.

The vehicle body height changing switch 8 is connected to the controller 4 to change the vehicle body height from the normal height value to the high height value, for example. When the vehicle body height changing switch is alternatively changed from a "normal" position to a "high" position, air is supplied into the air suspension 1 thereby displacing the vehicle body upwardly by comparing a difference from a set value with respect to the axle supporting member. This value is set as a reference height. When the vehicle body height changing switch 8 is changed to the "normal" position from the "high" position, the air in the air suspension 1 is discharged to lower the vehicle body height to the normal value.

According to conventional vehicle body height adjusting apparatus described above, the controlling of the supply valve 51 or the discharge valve 52 of the air flow regulator is performed regardless of the vehicle speed. And the vehicle body height is changed by the regulator 5 only by subtracting the objective vehicle body height signal from the relative displacement signal generated from the relative displacement sensor 3. Accordingly, the time required for adjusting the vehicle body height is substantially constant. In a case where this adjusting time is set to a relatively short time, for example 1 to 2 sec., which is desirable at low vehicle speed, such a short adjusting time may give uneasiness to the passenger when the vehicle is running at high speed.

With the present invention conceived by taking the above problem into consideration, a vehicle speed sensor 9 for detecting the vehicle speed and generating a signal representing the vehicle speed is provided.

Figure 2:
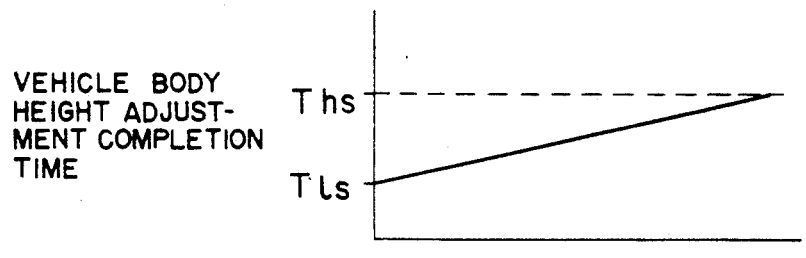
FIG. 2 shows a graph showing the characteristics of a vehicle body height adjustment completion time with respect to a running speed of a vehicle.

FIG. 2 shows a graph showing a relationship between the vehicle speed and the vehicle body height adjustment completion time T on the basis of the vehicle speed signal. As will be understood from FIG. 2, according to the vehicle speed sensor 9, the vehicle body height adjusting time is set at a relatively long time period Ths (5 to 6 sec., for example) at the high vehicle speed, and at a gradually reduced short time period Tls (1 to 2 sec., for example, at an extremely low speed) as the speed is reduced.

Figure 3:
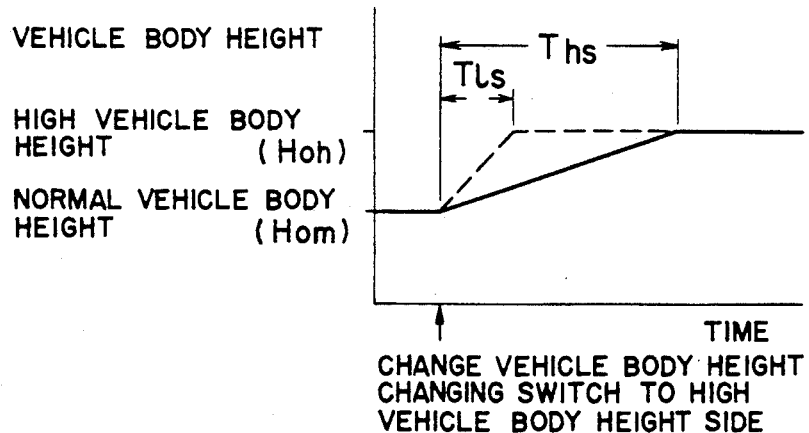
FIG. 3 is a graph showing changes in the vehicle body height with respect to the time elapsed with the vehicle speed as a parameter.

Furthermore, according to the present invention, a logic circuit 41 is incorporated into the controller 4. The logic circuit 41 operates, as shown in FIG. 3, so as to transmit a signal representing a present reference vehicle body height $H'_o$ which will become an objective reference vehicle body height $H_o$. The objective reference vehicle body height $H_o$ is continuously changed within the vehicle body height adjustment completion time interval T after switching the vehicle body height changing switch 8. A signal $\Delta H$ representing a vehicle body height adjusting amount is obtained by subtracting the present reference vehicle body height signal $H'_o$ output from the logic circuit 41, from a relative displacement signal H output from the relative displacement sensor 3. In a case where the thus obtained vehicle body height adjusting amount signal $\Delta H$ becomes a negative value, an electric current passes to the air supply valve 551 of the air flow regulating valve means 5 to supply the air into the air suspension 1 thereby raising the vehicle body upwardly. On the other hand, in a case where the vehicle body height adjusting amount signal $\Delta H$ becomes a positive value, an electric current passes to the air discharge valve 52 of the air flow regulator 5 to discharge the air from the air suspension 1 thereby lowering the vehicle body downwardly. Current control in the above operations is continuously performed until the vehicle body height adjusting amount signal $\Delta H$ becomes zero.

As described above with reference to FIG. 3 when the vehicle body height changing switch 8 is changed from the "normal" position to the "high" position during the high vehicle speed, the vehicle body height adjustment is performed within the vehicle body height adjustment completion time interval Ths which has been set to have a relatively long period (as shown by the solid line in FIG. 3) whereby the running stability can be ensured. On the other hand, as the vehicle speed has been gradually reduced, the vehicle body height adjustment completion time has been gradually shortened and, during the extremely low vehicle speed, the vehicle body height adjustment is performed within the short vehicle body height adjustment completion time interval Tls which has been set to have a relatively short period as shown by a dotted line in FIG. 3, whereby the height adjustment is definitely observed by anybody.

In a case where it is required to adjust the vehicle body height when the motor vehicle is in an auto stop for maintenance, it is also desired to set the height adjustment completion time so as to have a long time period. Accordingly, a maintenance switch is provided for indicating that the motor vehicle body is under the condition of the maintenance and the vehicle height adjustment completion time T is set to have a long time period Ths as shown by the dotted line in FIG. 2 when the maintenance switch is operated.

Figure 4:
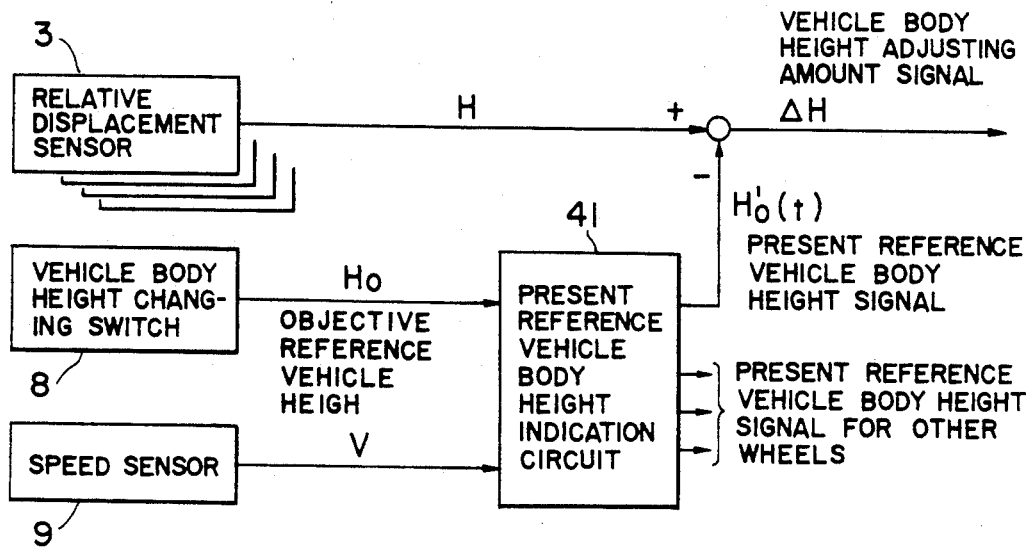
FIGS. 4 and 5 show a block diagram and a flowchart of a control mode according to the present invention.
Figure 5:
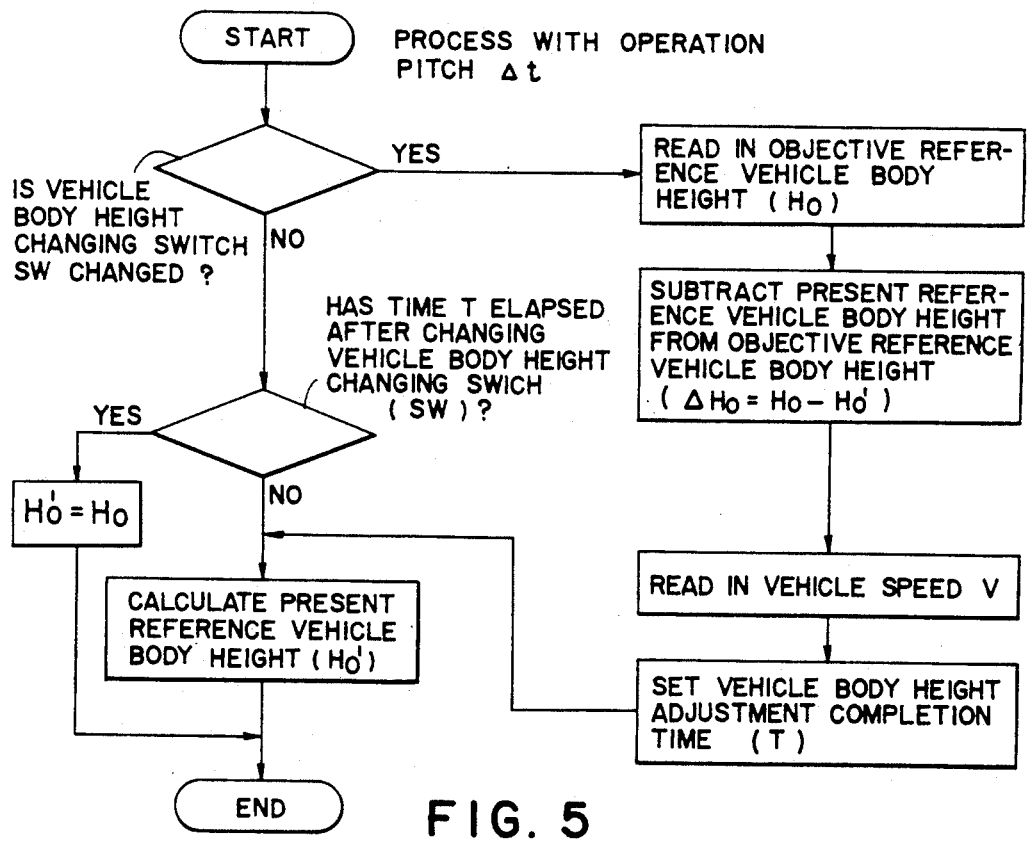

FIGS. 4 and 5 show a block diagram and a flowchart representing the controlling procedures described above. In the flowchart, the difference $\Delta H_o$ between the objective reference vehicle body height $H_o$ and the present reference vehicle body height $H'_o$ is deemed to be $\Delta H_o = H_o - H'_o$. This means that when the vehicle body height changing switch 8 is again operated, after the switch 8 has been operated once, within the vehicle body height adjustment completion time T, a signal representing a new vehicle body height adjusting amount $\Delta H_o$ is obtained by subtracting the present reference vehicle body height $H'_o$ just before the switching operation of the changing switch 8, from a new objective reference vehicle body height $H_o$.

Figure 6:
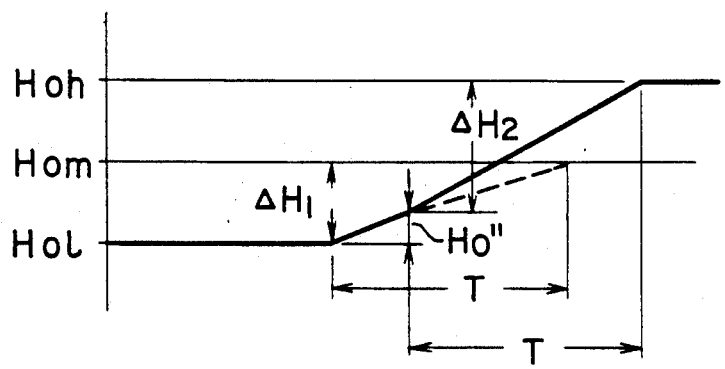
FIG. 6 shows a graph representing a condition in which the vehicle body height changing means is again operated before the completion of vehicle body height adjustment.

FIG. 6 is a graph showing a vehicle body height adjustment condition in which a vehicle body height adjustment is performed to change the vehicle height from a low body height $H_{ol}$ to a high body height $H_{oh}$ by switching the vehicle body height changing switch 8 step by step from a low body height position to a normal body height position and then from the normal body height position to a high body height position. Referring to FIG. 6, a signal representing a vehicle body height adjusting amount $\Delta H_2$ is calculated from a signal representing a present vehicle body height $H''_o$ at a re-switching operation and from a signal representing a new objective reference vehicle body height $H_{oh}$. The height adjustment can be smoothly performed within the vehicle body height adjustment completion time interval T responsive to the vehicle body height adjusting signal $\Delta H_2$. In FIG. 6, the vehicle body height adjusting amount $\Delta H_1$ at the first switching operation of the changing switch 8 is represented by the equation $\Delta H_1 = H_{om} - H_{ol}$.

Figure 7A:
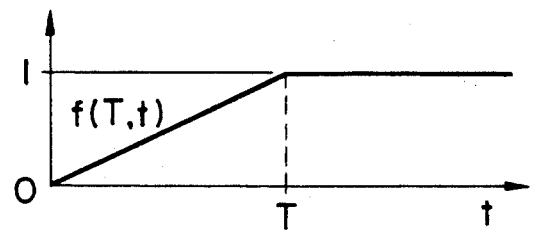
FIGS. 7a to 7c show graphs representing conditions in which a present reference vehicle body height is changed in a linear form, in the form of a secondary function and a trigonometric function, respectively.
Figure 7B:
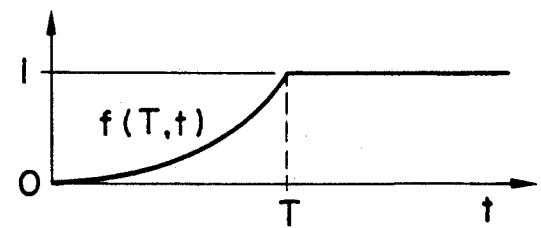
Figure 7C:
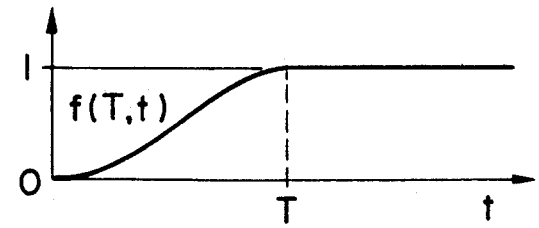
Figure 7D:
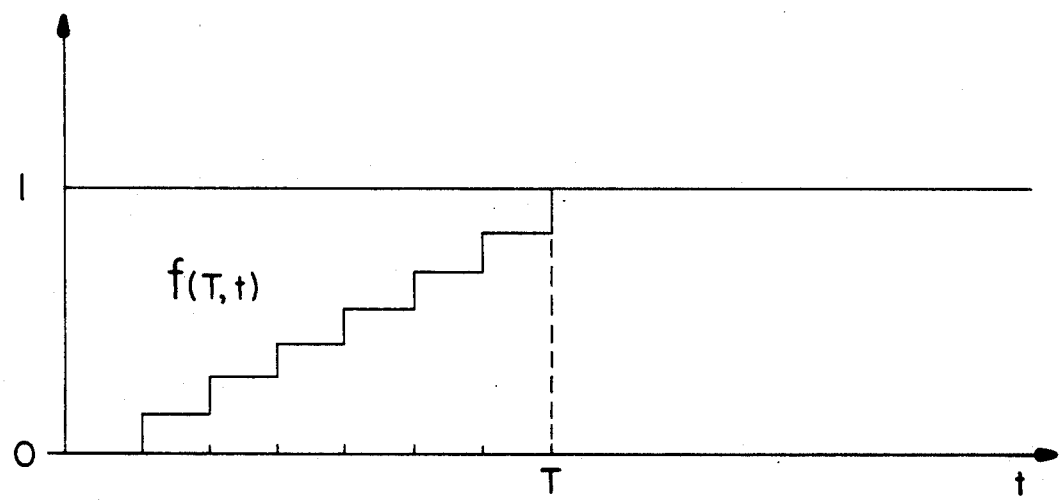

In the foregoing description made with reference to the preferred embodiment of the present invention, there is described an embodiment in which the present reference vehicle body height $H'_o$ is linearly increased as shown in FIG. 9. However, in a modification in which the present reference vehicle body height $H'_o$ is represented by equation $H'_o = H_o - \{1 - f(T,t)\}$, it may be possible to change the present reference vehicle body height $H'_o$ in the form of a secondary function as shown in FIG. 7b, in which the function f(T,t) is made $(t/T)^2$. In a further modification as represented by FIG. 7c, the present reference vehicle body height $H'_o$ may be changed in the form of a trigonometric function, in which the function f(T,t) is made $\frac{1}{2}(1-\cos\pi t/T)$. In a still further modification, not shown, the present reference vehicle body height $H'_o$ may be changed stepwisely. FIG. 7a represents a case in which the function f(T,t) is made t/T and the present reference vehicle body height $H'_o$ changes linearly.

With the embodiments described hereinabove, although the height adjusting completion time can be variably changed responsive to the vehicle speed, it will be easily understood by persons in the art that substantially the same effects can be attained by variably body controlling the vehicle body height adjusting speed responsive to the vehicle speed, and moreover, that the present invention can be applied to a motor vehicle where the vehicle height adjustment of which is performed with respect to only the front wheels or rear wheels instead of which the vehicle height adjustment is performed with respect to all four wheels.

The present invention can also be applied to a motor vehicle provided with a hydro-pneumatic suspension system or hydraulic suspension system. In such an application, the air supplying valve or the air discharge valve of the flow regulator is opened responsive to the valve open-close signal from the controller. According to this valve opening operation, oil accumulated in an accumulator under a predetermined pressure is supplied into an oil cylinder of the suspension by an oil pump. Or the oil in the oil cylinder of the suspension is drained into a reservoir.

Although a flow regulator is used in the described embodiment, a pressure regulating valve means may be positively applied as an alternative for attaining substantially the same effects described hereinbefore. In such an embodiment, the indication amount represents an indication pressure of the inner pressure of the suspension. The valve means designated by reference numeral 5 in FIG. 1 may be substituted with one pressure control valve. A coil spring may also commonly utilized for the suspension.

Furthermore, the present invention can be applied to a suspension system which is operated to change the vehicle body height by a usual electric motor or a stepping motor. The comparison control is omitted when a stepping motor is incorporated.

Still furthermore, in the described embodiment, the vehicle body height changing switch is used as a vehicle body height changing means, which is manually changed, but it may be possible to utilize an automatic adjustment by a signal representing vertical acceleration or a signal representing a driving mode indicating two-wheel drive or four-wheel drive. This adjustment may be performed by the combination of these signals.

While the presently preferred embodiments of the present invention have been shown and described, it is to be understood that these disclosures are for the purpose of illustration and that various changes and modifications may be made without departing from the scope of the present invention as set forth in the appended claims.

What is claimed is:

1. An apparatus for adjusting a vehicle body height by controlling fluid in a suspension system provided for a wheel of a vehicle, comprising:
   a speed sensor provided to detect vehicle speed;
   a displacement sensor connected to the suspension system for detecting a vertical relative displacement of a vehicle body;
   regulating means connected to the suspension system for regulating an amount of the fluid to the suspension system;
   a switch provided to change an objective reference vehicle body height;
   setting means for variably setting a vehicle body height adjusting time in response to said vehicle speed;
   first calculating means for calculating a present reference vehicle body height defined by a function in which a reference vehicle body height is gradually changed to the objective reference vehicle body height from a value of the reference vehicle body height at the time when the objective reference vehicle body height is changed by said switch, while said vehicle body height adjusting time elapses; and second calculating means for calculating a difference between the present reference vehicle body height and the vertical relative displacement so as to control said regulating means such that said difference becomes zero, thereby gradually changing the vehicle body height to said objective reference vehicle body height within said vehicle body height adjusting time when said objective reference vehicle body height is changed by said switch.

2. The apparatus according to claim 1, wherein;
said regulating means comprises an air flow regulator including an air supply valve and an air discharge valve.

3. The apparatus according to claim 1, wherein said first calculating means has said function which is a linearly increasing function.

4. The apparatus according to claim 1, wherein said first calculating means has said function which is a secondary increasing function.

5. The apparatus according to claim 1, wherein said first calculating means has said function which is a trigonometric increasing function.

6. An apparatus for adjusting a vehicle body height by controlling fluid in a suspension system provided for a wheel of a vehicle, comprising:
a speed sensor provided to detect vehicle speed;
a displacement sensor connected to the suspension system for detecting a vertical relative displacement of a vehicle body;
regulating means connected to the suspension system or regulating an amount of the fluid to the suspension system;
a switch provided to change an objective reference vehicle body height;
setting means for variably setting a vehicle body height adjusting speed in response to said vehicle speed;
first calculating means for calculating a present reference vehicle body height defined by a function in which a reference vehicle body height is gradually changed, upon said vehicle body height adjusting speed, to the objective reference vehicle body height from a value of the reference vehicle body height at the time when the objective reference vehicle body height is changed by said switch; and
second calculating means for calculating a difference between the present reference vehicle body height and the vertical relative displacement so as to control said regulating means such that said difference becomes zero, thereby gradually changing the vehicle body height to said objective reference vehicle body height when said objective reference vehicle body height is changed by said switch.

7. The apparatus according to claim 6, wherein said first calculating means has said function which is a linearly increasing function.

8. The apparatus according to claim 6, wherein said first calculating means has said function which is a secondary increasing function.

9. The apparatus according to claim 6, wherein said first calculating means has said function which is a trigonometric increasing function.

10. The apparatus according to claim 6, wherein said regulating means comprises an air flow regulator including an air supply valve and an air discharge valve.

11. A method for adjusting a vehicle body height by controlling fluid in a suspension system provided for a wheel of a vehicle having a vehicle speed sensor, a displacement sensor, regulating means, a switch and control means, said method comprising the steps of:
detecting the vehicle speed by the vehicle speed sensor;
detecting a vertical relative displacement of a vehicle body by the displacement sensor;
regulating an amount of the fluid to the suspension system by the regulating means;
changing an objective reference vehicle body height by the switch;
setting a vehicle body height adjusting speed in response to the vehicle speed;
calculating a present reference vehicle body height defined by a function in which a present reference vehicle body height is changed, upon said vehicle body height adjusting speed, to the objective reference vehicle height from a value of the reference vehicle body height at a time when the objective reference vehicle body height is changed by the switch;
calculating a difference between the present reference vehicle body height and the vertical relative displacement; and
controlling the regulating means in accordance with said difference, thereby gradually changing the vehicle body height to the objective reference vehicle body height when the objective reference vehicle body height is changed by the 12. The method according to claim 11, wherein said function is a linearly increasing function.

13. The method according to claim 11, wherein said function is a secondary increasing function.

14. The method according to claim 11, wherein said function is a trigonometric increasing function.

15. The method according to claim 11, wherein said function is a stepwisely increasing function.

16. A method for adjusting a vehicle body height by controlling fluid in a suspension system provided for a wheel of a vehicle having a vehicle speed sensor, a displacement sensor, regulating means, a switch and control means, said method comprising the steps of:
detecting the vehicle speed by the vehicle speed sensor;
detecting a vertical relative displacement of a vehicle body by the displacement sensor;
regulating an amount of the fluid to the suspension system by the regulating means;
changing an objective reference vehicle body height by the switch;
setting a vehicle body height adjusting time in response to the vehicle speed;
calculating a present reference vehicle body height defined by a function in which a present reference vehicle body height is changed to the objective reference vehicle height from a value of the reference vehicle body height at a time when the objective reference vehicle body height is changed by the switch, while said vehicle body height adjusting time has elapses;

calculating a difference between the present reference vehicle body height and the vertical relative displacement; and controlling the regulating means in accordance with said difference, thereby gradually changing the vehicle body height to the objective reference vehicle body height when the objective reference vehicle body height is changed by the switch.

17. The method according to claim 16, wherein said function is linearly increasing function.

18. The method according to claim 16 wherein said function is a secondary increasing function.

19. The method according to claim 16, wherein said function is a trigonometric increasing function.

20. The method according to claim 16, wherein said function is a stepwisely increasing function.

* * * * *